Figure 1:
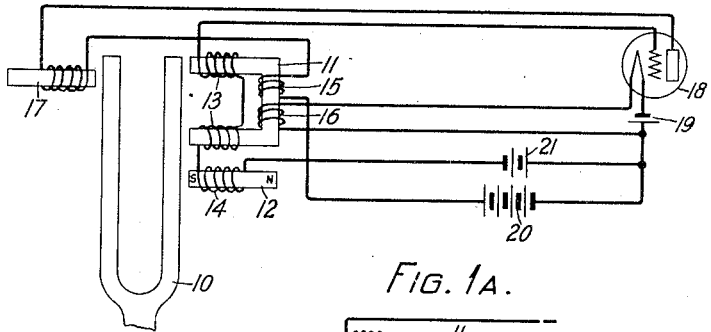
Figure 1A:
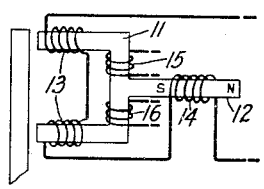

Feb. 19, 1929.

W. A. MARRISON 1,702,568

CONSTANT FREQUENCY WAVE SOURCE

Filed Nov. 26, 1927

INVENTOR:
WARREN A. MARRISON
BY J. P. Neville
ATTORNEY

Patented Feb. 19, 1929.

1,702,568

UNITED STATES PATENT OFFICE.

WARREN A. MARRISON, OF ORANGE, NEW JERSEY, ASSIGNOR TO BELL TELEPHONE LABORATORIES, INCORPORATED, OF NEW YORK, N. Y., A CORPORATION OF NEW YORK.

CONSTANT FREQUENCY WAVE SOURCE.

Application filed November 26, 1927. Serial No. 235,771.

This invention relates to oscillators or generators employing mechanical vibratory systems and particularly to those in which the vibratory system determines the frequency of the oscillations generated.

An object of the invention is to prevent such variations in the amplitude of vibration of the mechanical vibratory systems as tend to cause variations in the rate of vibration of such systems.

As is well recognized, the rate of vibration of a mechanical vibratory system, such as a tuning fork, tuned reed or the like, is to some extent dependent on the amplitude of vibration.

When the vibratory system is maintained in vibration by the use of a well known arrangement, for example, an amplifier coupling the controlling and driving elements, variations in circuit conditions, such as power supply, tend to vary the amplitude of vibration. When such systems are used as the frequency determining element of an oscillator, variations in the amplitude of vibration of the system will tend to cause variations in frequency of the oscillations generated. The effect of variations, which tend to increase the amplitude and so decrease the frequency, are particularly objectionable.

In a specific form shown herein, the invention is embodied in a tuning fork oscillator in which an electromotive-force of frequency proportional to the rate of vibration of the fork is generated in a pick-up or control circuit and amplified in an electric discharge device to be supplied to a load circuit and to an electromagnetic driving unit arranged to maintain the fork in vibration.

The pick-up circuit comprises two windings which are employed to limit the amplitude of vibration as hereinafter described. One winding is mounted on a core of the open circuit type, and the other on a core of the closed circuit type. The electromotive force generated in the first winding will be greater than that generated in the second winding for small amplitudes of vibration and smaller for large amplitudes. By connecting the second winding to oppose the first, the net voltage applied to the amplifier will reach a maximum value at some amplitude of vibration and will decrease as the amplitude is further increased.

Such a system may be operated so that the amplitude of vibration will never exceed a desired value. This may be secured by so relating the fork, pick-up windings, and the driving units that any increase in amplitude of the fork above a selected value will cause a decrease in the control voltage supplied to the amplifier and consequently a decrease in the driving force applied to the fork.

An additional means may be provided to more directly prevent such variations in the amplitude of vibration as may be caused by variations in the amplifier power supply. This means may consist of magnetizing windings mounted on the closed core pick-up element, the windings being respectively connected in the cathode heating circuit and the space current circuit of the amplifier. By means of this arrangement the voltage supplied to the input of the amplifier will be controlled by the power supply, and when the circuit elements are properly proportioned, will exactly oppose the effect of variations in the power supply upon the output of the amplifier, whereby the current supplied to the driving unit may be maintained constant irrespective of power variations.

This invention is not limited to the particular embodiment described and various modifications may be employed for utilizing the principles thereof. For example, the general principle of employing two control means oppositely responsive to mechanical vibrations of different amplitudes may be utilized by employing a single pick-up element and two amplifier circuits of different characteristics connected in opposition to the driving element. In this type of system the amplifier circuits are adjusted in a manner similar to the pick-up elements in the embodiment above described, so that any increase in the amplitude of vibration above a desired maximum will produce a decrease in the driving force for the mechanical vibrating system.

Figure 2:
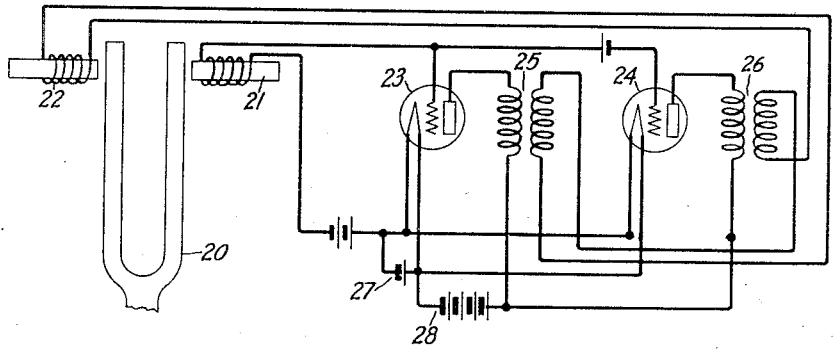
Figure 3:
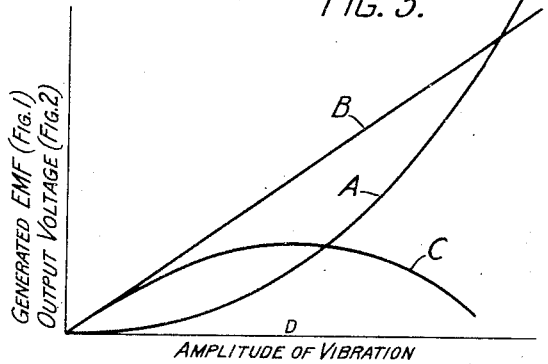

This invention can be more readily understood by reference to the following detailed description when read in connection with the drawing, in which:

Fig. 1 shows one embodiment including a tuning fork oscillator employing two magnetic pick-up elements;

Fig. 1ᴬ shows a modification of the pick-up arrangement of the system of Fig. 1;

Fig. 2 shows another embodiment of the invention employing two vacuum tube circuits which performs similar functions to the two pick-up elements in the system of Fig. 1; and Fig. 3 shows curves, plotted between amplitude of vibration and pick-up voltage which illustrate the operation of the invention.

Referring to Fig. 1, there is shown a tuning fork 10 provided with two magnetic pick-up or control elements 11 and 12 each comprising magnetic cores on which are mounted energizing windings 13 and 14, respectively. Element 11 is also provided with magnetizing windings 15 and 16. The fork is also provided with an electromagnetic driving element 17.

The generating or pick-up windings 13 and 14 are connected in series in the grid circuit of an electric discharge device 18 and the winding of the driving element 17 is connected in the plate circuit thereof.

As is well understood in the art, the fork is maintained in vibration by means of the coupling between the pick-up and driving elements through the discharge device 18. The vibration of the fork generates waves in the windings of the pick-up elements which are impressed on the grid circuit of the device 18, and after being amplified by 18, are transmitted through the plate circuit, which includes the winding of the driving element 17.

Cathode heating current for the device 18 is supplied from a battery 19 through the magnetizing winding 16. Space current is supplied from the battery 20 through the magnetizing winding 15 in series with the winding of the driving element 17. Battery 21 supplies a biasing potential for the grid of the amplifier 18 over a circuit including the windings 14 and 13 in series.

Since the core of the pick-up element 11 is of the closed circuit type and that of the element 12 is of the open circuit type, the elements may be so designed that the electromotive force generated in the windings 13 will be smaller than that generated in the winding 14 for small amplitudes of vibration of the fork 10, while for large amplitudes of vibration the electromotive force generated in the winding 14 will be smaller than those generated in the winding 13.

With the windings 13 and 14 connected in opposition the net voltage impressed on the input circuit of the amplifier will increase with increasing amplitudes of vibration until some definite point is reached, dependent upon the characteristics of the pick-up elements, and decrease with any further increase in amplitude.

This operation can be best understood by reference to Fig. 3 in which generated electromotive force is plotted against amplitude of vibration. Curve A represents the electromotive force generated in the windings 13 and curve B that generated in the windings 14

As shown by the curves the electromotive force in winding 14 is practically directly proportional to the amplitude of vibration, while in the case of winding 13 the electromotive force is proportional to some power of the amplitude of vibration. This is due to the fact that vibrations of small amplitude have very little effect on the magnetic circuit of element 11 due to the magnetic leakage between the poles.

Curve C represents the difference between curves B and A and consequently the voltage impressed on the input of the device 18 with the windings connected in opposition. Curve C shows that the amplitude of vibration of the fork cannot be made to exceed a certain value D, for which amplitude the voltage impressed upon the input of the amplifier is a maximum. Any increase in amplitude of vibration above this amount, will decrease the voltage impressed upon the amplifier and consequently decrease the energy supplied through the output circuit to the driving element 17. By properly designing the pick-up elements 11 and 12, this maximum amplitude can be kept as small as desirable.

However, even with the use of two pick-up elements, as above described, variations in the sources of energy supplied to the amplifier 18 will have a small effect upon the amplitude of vibration causing variations below the maximum amplitude D. Such variations are substantially eliminated by the use of the magnetizing windings 16 and 15 connected in series with the cathode heating and plate current supply batteries 19 and 20, as shown.

By using the windings 16 and 15, any increase in voltage of either battery will increase the magnetization of the element 11, causing a consequent increase in the electromotive force generated in the windings 13. An increase in voltage of either battery tends to increase the current flowing through the output circuit of device 18. However, the winding 13 is connected in the grid circuit of the device 18 in such a direction that increases in the voltage generated therein, tend to decrease the output current of the device. Therefore, the system may be so designed that the effect of such increases in the voltage generated in the windings 13 will exactly oppose the effect of the increases in the voltages of the batteries. A similar compensating effect is produced for decreases in voltages of the batteries.

Fig. 1^A shows a modification of the system of Fig. 1, in which the two elements 11 and 12 are combined in one structure, the systems in other respects being similar.

Fig. 2 shows a modification of the invention in which the same general principle, employed in the embodiment shown in Fig. 1, is used by providing two amplifier circuits instead of two pick-up elements.

The system comprises a tuning fork 20 which is provided with a pick-up element 21 and a driving element 22. The pick-up element is connected to the grid circuits of two electric discharge amplifiers 23 and 24 in parallel. The outputs of these amplifiers are connected in series-opposing relation by means of the output transformers 25 and 26 to the driving element 22. These amplifier circuits are so designed that the characteristic of the amplifier 23 is represented by the curve B and the characteristic of the amplifier 24 is represented by the curve A over their respective ranges of operation. The curves in this case represent output voltage plotted against amplitude of vibration. Curve C will then represent the net voltage supplied to the driving element 22, so that the system will operate in the manner similar to that of Fig. 1.

In this system cathode heating current and space current are supplied to both amplifiers from the common batteries 27 and 28, respectively. Fluctuations in the battery voltages will have similar effects on the characteristics of the two amplifiers with the result that, since the outputs of the amplifiers are connected in opposition, their effect upon the driving force applied to the fork will be practically nil.

What is claimed is:

1. In combination a mechanical vibratory member, means for producing two waves having frequencies proportional to the rate of vibration of said member, one of said waves having an amplitude which is greater than the amplitude of the other of said waves for low amplitudes of vibration and smaller for high amplitudes of vibration, and means for supplying to said member a driving force proportional to the difference in amplitudes of said waves.

2. In combination a mechanical vibratory member, means for producing two waves of frequencies similarly proportional to the rate of vibration of said member, the amplitude of one of said waves being proportional to a higher power of the amplitude of vibration of said member than the amplitude of the other wave, means for combining said waves to produce a third wave having a maximum amplitude for a definite amplitude of vibration of said member and decreasing in amplitude as the amplitude of vibration of said member varies in either direction from said definite amplitude, and means for supplying to said member a driving force proportional to the amplitude of said third wave.

3. In combination a mechanical vibratory member, an electromagnetic pick-up element of the closed magnetic circuit type for generating an electromotive force of frequency proportional to the rate of vibration of said member, a second electromagnetic pick-up element of the open magnetic circuit type for generating a second electromotive force of frequency proportional to the rate of vibration of said member, and means responsive to the difference in amplitude of said electromotive forces for driving said member.

4. A driving apparatus for a mechanical vibratory member comprising a plurality of control circuits responsive to vibrations of said system, one of said control circuits having a greater response for vibrations of small amplitude and a smaller response for vibrations of large amplitude than another of said control circuits, and means oppositely controlled by said two control circuits for driving said system.

5. A tuning fork oscillator comprising a tuning fork, a plurality of electromagnetic elements responsive to the vibrations of said fork, one of said elements having a greater response for vibrations of small amplitude and a smaller response for vibrations of large amplitude than another of said elements, an amplifier, means connecting said two electromagnetic elements in opposition to the input of said amplifier, and electromagnetic means for driving said fork connected to the output of said amplifier.

6. In combination a mechanical vibratory member, an electric discharge amplifier having an anode and cathode, a source of space current and a source of cathode heating current for said amplifier, means connected to said amplifier for applying a driving force to said vibratory member, means for producing an electromotive force of amplitude proportional to the voltages of said sources, and means for impressing said electromotive force upon said driving means to oppose the effect of variations in the voltages of said sources upon the magnitude of the driving force.

7. A tuning fork oscillator comprising a tuning fork, an electric discharge amplifier having an anode, a cathode and a control electrode, a source of current for energizing said amplifier, means responsive to vibrations of said fork connected to the control electrode circuit of said amplifier, means for driving said fork connected to the anode circuit of said amplifier, and means for impressing upon said control electrode circuit a potential proportional to the potential of said source to maintain the effect of said driving means substantially constant irrespective of variations in the potential of said source.

8. A tuning fork oscillator comprising a tuning fork, an electric discharge amplifier having an anode, a cathode and a control electrode, a source of space current and a source of cathode heating current for said amplifier, means responsive to vibrations of said fork connected to the control electrode circuit of said amplifier, means for driving said fork connected to the anode circuit of said amplifier, and means for impressing upon the control electrode circuit potentials proportional to the potentials of said sources to maintain the effect of said driving means substantially constant irrespective of variations in the potentials of said sources.

9. In combination a mechanical vibratory system, an electromagnetic pick-up element of the closed magnetic circuit type, an electromagnetic pick-up element of the open circuit type, a generating winding for each of said elements, an electric discharge amplifier having an anode, a cathode and a control electrode, a source of current for energizing said amplifier, a magnetizing winding for said first pick-up element connected to receive magnetizing current from said source, means for connecting the generating winding of said second pick-up element to the control electrode circuit of said amplifier, means for connecting the generating winding of said first pick-up element to the control electrode circuit of said amplifier to oppose the effect of said second pick-up element thereon, and means for driving said vibratory system connected to the anode circuit of said amplifier.

10. In combination a mechanical vibratory system, an electromagnetic pick-up element of the closed magnetic circuit type, an electromagnetic pick-up element of the open circuit type, a generating winding for each of said elements, an electric discharge amplifier having an anode, a cathode and a control electrode, a source of space current and a source of cathode heating current for said amplifier, magnetizing windings for said first pick-up element connected to receive magnetizing current from said sources, means for connecting the generating winding of said second pick-up element to the control electrode circuit of said amplifier, means for connecting the generating winding of said first pick-up element to the control electrode circuit of said amplifier to oppose the effect of said second pick-up element thereon, and means for driving said vibratory system connected to the anode circuit of said amplifier.

11. The method of limiting variations in the amplitude of vibration of a mechanical vibratory member which comprises producing two waves of frequencies similarly proportional to the rate of vibration of said member and of amplitudes differently proportional to the amplitude of vibration of said member, the amplitude of one of said waves being proportional to a higher power of the amplitude of vibration of said member than the other of said waves, and supplying to said member a driving force of amplitude proportional to the difference in the amplitudes of said waves.

12. The method of regulating the amplitude of vibration of a tuning fork which comprises producing two waves of frequency proportional to the rate of vibration of the fork the amplitude of one of said waves being greater than the amplitude of the other for small amplitudes of vibration of said fork and smaller for large amplitudes of vibration of said fork, combining said waves to produce a third wave the amplitude of which is a maximum for a given amplitude of vibration of the fork and decreases as the amplitude of vibration varies in either direction from said amplitude, and supplying a driving force to said fork proportional to the amplitude of said third wave.

In witness whereof, I hereunto subscribe my name this 22 day of November A. D., 1927.

WARREN A. MARRISON.